United States Patent
Kumar et al.

(10) Patent No.: US 11,348,287 B2
(45) Date of Patent: May 31, 2022

(54) RENDERING OF GRAPHIC OBJECTS WITH PATTERN PAINT USING A GRAPHICS PROCESSING UNIT

(71) Applicant: Adobe Inc., San Jose, CA (US)

(72) Inventors: Harish Kumar, Noida (IN); Anmol Sud, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/036,647

(22) Filed: Jul. 16, 2018

(65) Prior Publication Data
US 2020/0020139 A1 Jan. 16, 2020

(51) Int. Cl.
G09G 5/00 (2006.01)
G06T 11/00 (2006.01)
G06T 11/40 (2006.01)
G06T 1/20 (2006.01)

(52) U.S. Cl.
CPC .............. *G06T 11/001* (2013.01); *G06T 1/20* (2013.01); *G06T 11/40* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 6,271,859 B1 * | 8/2001 | Asente | ................. | G06T 11/001 345/589 |
| 6,478,680 B1 * | 11/2002 | Yoshioka | ................ | A63F 13/10 463/43 |
| 6,795,080 B2 * | 9/2004 | Lavelle | ................. | G06T 11/001 345/503 |
| 8,219,370 B1 * | 7/2012 | DiVerdi | .................. | G06F 30/20 703/9 |
| 8,264,503 B1 * | 9/2012 | Parenteau | ............... | G06T 11/40 345/619 |
| 8,514,238 B2 * | 8/2013 | Winnemoeller | ...... | G06T 11/001 345/582 |
| 9,161,006 B1 * | 10/2015 | Wang | ........................ | G06T 1/60 |
| 2002/0158881 A1 * | 10/2002 | vanWelzen | ............. | G06T 11/40 345/582 |
| 2005/0030317 A1 * | 2/2005 | Spicer | .................... | G06T 11/001 345/582 |
| 2005/0116963 A1 * | 6/2005 | Bourdev | ................. | G06T 11/40 345/619 |
| 2006/0209061 A1 * | 9/2006 | Burch | ..................... | G06T 13/00 345/419 |

(Continued)

*Primary Examiner* — Anh-Tuan V Nguyen
(74) *Attorney, Agent, or Firm* — FIG. 1 Patents

(57) ABSTRACT

A technique and computing device to render graphic objects associated with pattern paint in a digital medium environment are disclosed. The computing device comprises a graphics processing unit. The graphics processing unit associates a first surface to a framebuffer of the computing device, renders pattern cells at the first surface, and associates a second surface to the framebuffer of the computing device. The pattern cells correspond to pattern paints, and the pattern cells are rendered at the first surface independent of the sequential order of the pattern cells for rendering pattern paint. The graphics processing unit renders graphic objects associated with the pattern paints, and the graphic objects are rendered at the second surface in sequential order for rendering pattern paint.

20 Claims, 10 Drawing Sheets

(56) References Cited

U.S. PATENT DOCUMENTS

| | | | |
|---|---|---|---|
| 2006/0267990 A1* | 11/2006 | Rogers | G06T 1/20 345/502 |
| 2007/0002069 A1* | 1/2007 | Hoppe | G06T 11/001 345/582 |
| 2008/0079658 A1* | 4/2008 | Naito | G06F 3/1446 345/2.2 |
| 2008/0094411 A1* | 4/2008 | Parenteau | G06T 15/503 345/592 |
| 2008/0109171 A1* | 5/2008 | McGraw | G01R 33/56341 702/19 |
| 2010/0226593 A1* | 9/2010 | Gerhard | G06F 16/51 382/299 |
| 2011/0141301 A1* | 6/2011 | Raghoebardajal | G06T 11/203 348/222.1 |
| 2011/0148894 A1* | 6/2011 | Duprat | G06T 11/001 345/552 |
| 2011/0285740 A1* | 11/2011 | Kilgard | G06T 15/005 345/589 |
| 2012/0092366 A1* | 4/2012 | Smithers | G06T 11/001 345/629 |
| 2013/0063463 A1* | 3/2013 | Clark | G09G 5/00 345/582 |
| 2015/0348280 A1* | 12/2015 | Oriol | G06T 1/60 345/582 |
| 2016/0012618 A1* | 1/2016 | James | G06T 11/203 345/442 |
| 2016/0249108 A1* | 8/2016 | Sexton | H04N 21/47217 |
| 2018/0068640 A1* | 3/2018 | Martin | G06K 9/0061 |
| 2018/0075641 A1* | 3/2018 | Ceylan | G06T 11/001 |
| 2018/0349444 A1* | 12/2018 | Mulligan | G06T 11/001 |
| 2019/0026925 A1* | 1/2019 | Sakurai | G06T 15/04 |

\* cited by examiner

RENDERING OF GRAPHIC OBJECTS WITH PATTERN PAINT USING A GRAPHICS PROCESSING UNIT

BACKGROUND

Computing tools, such as computers, tablets, mobile devices, and cloud services, are widely used to create artworks including images, videos, and multimedia, for desirable experiences by users. Artworks may include many components such as raster images and vector images. Raster images, also referred to as bitmap, are represented by an array of pixels within a grid of pixels. Vector images are represented by straight and/or curved paths, such as lines, shapes, and other graphic components, formatted by geometric formulas. Depending on the artwork, it may be advantageous to include raster images, vector images, or a combination of both.

Vector artwork may include graphic objects colored with different kinds of paints, such as constant color paints, gradients, gradient meshes, patterns and image paints. Graphic objects may be colored with pattern paint, which is a widely-used paint type in the world of artwork and illustration. For pattern paint, a particular tiling pattern may be repeated at fixed horizontal and vertical intervals to fill the area bounded by the outline of the vector object.

Vector artwork that includes graphic objects colored by pattern paint should be rendered within a reasonable period of time in order to maintain a pleasant user experience. Unfortunately, fast performance becomes increasingly difficult for rendering applications due to the significant increase in display densities of the devices and digitalization of content. The utilization of pattern paint can have a significant impact on the rendering time of graphic objects.

Rendering of vector artwork may be accelerated substantially by utilizing the features of a Graphics Processing Unit (GPU). The GPU is a specialized processor, working in conjunction with a Central Processing Unit (CPU), that is capable of improving execution of commands for manipulating and displaying images. GPU-accelerated computing offers faster performance across a broad range of image and video applications.

Even with a GPU, the process of rendering graphic objects colored with pattern paint takes time. Two common ways to render graphic objects having pattern paint are a recursive method and a tiling method. For the recursive method, pattern cell content is rendered for each horizontal and vertical repetition of the pattern cell. The pattern cell content is then clipped based on the geometry of the applied object. For the tiling method, a pattern cell is rendered on a first texture, the pattern cell's raster is copied to a second texture, and the pattern paint object is rendered by reading color values from the second texture. The tiling method requires time to manage its many textures as well as copies stored in a texture cache.

The recursive and tiling methods described above may not provide an acceptable user experience for many types of devices. The recursive method renders the vector content for each cell repetition, so it is inefficient for matters requiring many repetitions. The tiling method uses multiple textures and numerous switching steps, thus stalling and limiting the speed of operation. Also, both methods are sequential and do not exploit the full computational potential of a GPU.

SUMMARY

To overcome these problems, vector graphics rendering techniques are improved to leverage the capabilities of Graphics Processing Units (GPUs). In general, GPUs can render vector graphic images according to rendering orders. The vector graphics rendering techniques described herein implement the concept of out-of-order, and parallel, rendering of multiple pattern paint objects on a texture and reusing color values from the texture to paint the actual graphic object in correct paint order. By rendering the multiple pattern cells on a single pattern surface, or limited number of pattern surfaces, the GPU may efficiently process the pattern cells and render the graphic objects with minimal obstruction. The GPU utilizes a mapping between the graphic objects of the artwork and pattern cells of the pattern surface to facilitate the out-of-order processing of pattern cells on a single surface.

One aspect is a technique to render graphic objects associated with pattern paint in a digital medium environment. A first surface is associated with a framebuffer at the graphics processing unit. Pattern cells are then rendered at the first surface. The pattern cells are associated with pattern paints, and the pattern cells are rendered at the first surface independent of their sequential order for rendering pattern paint. Next, a second surface is associated with the framebuffer. Thereafter, graphic objects associated with the pattern paints are rendered. The graphic objects are rendered at the second surface in sequential order for rendering pattern paint.

Another aspect is a computing device for rendering graphic objects associated with pattern paint in a digital medium environment. The computing device comprises a graphics processing unit. The graphics processing unit associates a first surface to a framebuffer of the computing device, renders pattern cells at the first surface, and associates a second surface to the framebuffer of the computing device. The pattern cells correspond to pattern paints, and the pattern cells are rendered at the first surface independent of their sequential order for rendering pattern paint. The graphics processing unit renders graphic objects associated with the pattern paints, and the graphic objects are rendered at the second surface in sequential order for rendering pattern paint.

A further aspect is another technique to render graphic objects associated with pattern paint in a digital medium environment. A first surface is sent to a framebuffer at the graphics processing unit. Pattern cells are then rendered at the first surface. A location at the first surface is stored for each pattern cell of the pattern cells. Next, a second surface is associated with the framebuffer. Thereafter, graphic objects associated with the pattern paints are rendered. Color information is fetched from the first surface for each graphic object based at least in part on the location of the pattern cell associated with the corresponding pattern paint of the graphic object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
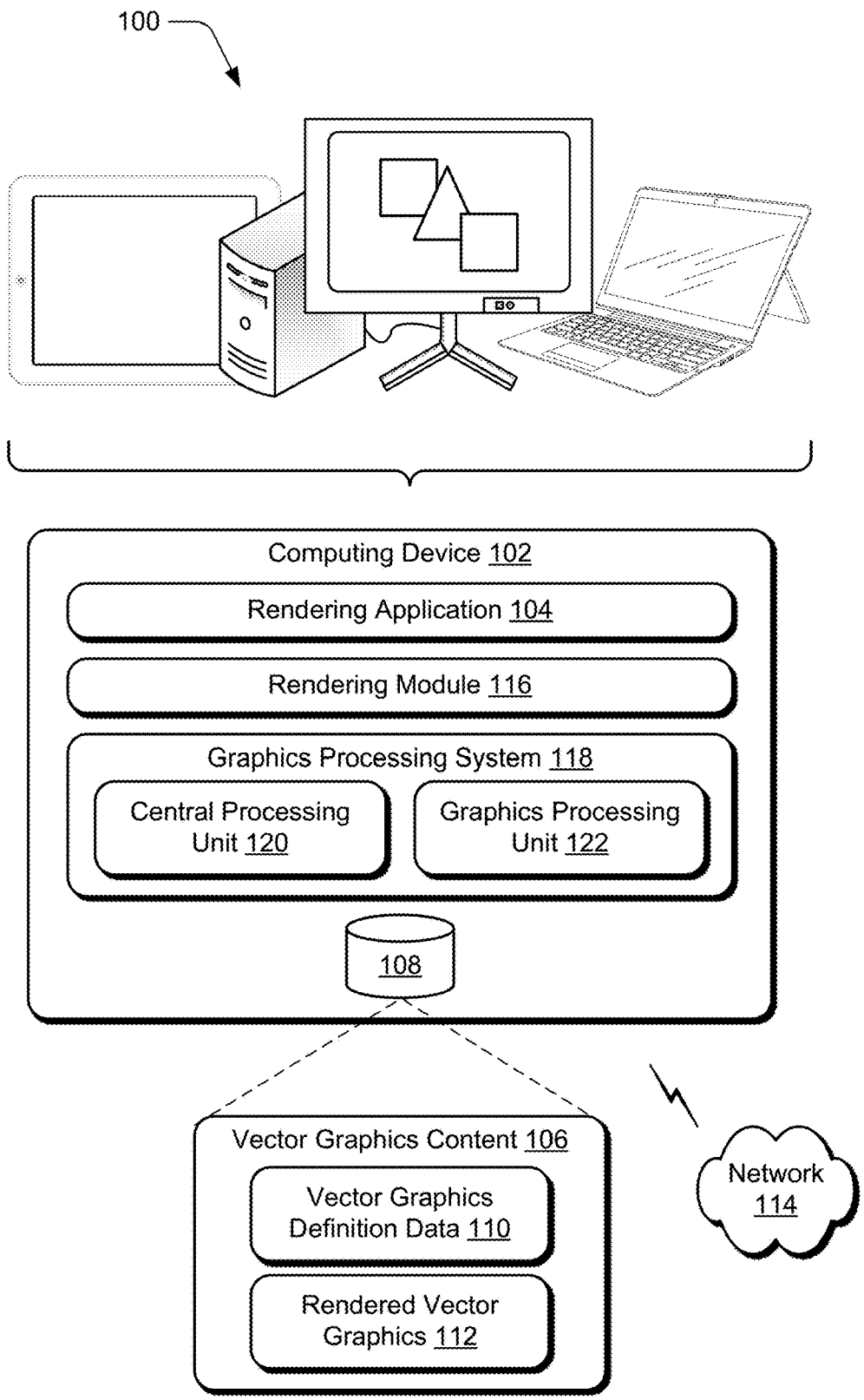
FIG. 1 is an illustration of an environment in an example implementation that is operable to employ digital image rendering techniques described herein.

While the present invention is susceptible of embodiment in various forms, there is shown in the drawings and will hereinafter be described presently embodiments with the understanding that the present disclosure is to be considered an exemplification of the invention and is not intended to limit the invention to the specific embodiments illustrated. One skilled in the art will hopefully appreciate that elements in the figures are illustrated for simplicity and clarity and have not necessarily been drawn to scale. For example, the dimensions of some of the elements in the figures may be exaggerated relative to other elements with the intent to help improve understanding of the aspects of the embodiments being illustrated and described.

Existing technologies for painting the graphic objects remain sequential and inefficient, and they do not exploit the full computational power of Graphics Processing Unit (GPU) hardware. Moreover, multiple steps in these existing technologies stall Central Processing Unit (CPU) processing, because the CPU waits for the issued commands to execute their completion on the GPU, such as generating a texture object, switching the current rendering framebuffer from the actual surface to the pattern surface, and vice-versa.

The digital image rendering techniques described herein overcomes the shortcomings in the existing technologies and achieves significantly higher frame rates with less of a memory footprint. The techniques include the management of the processing order for pattern cells of the graphic objects. Vector objects in an artwork are rendered in their sequential paint order for correct rendering of the artwork, but pattern cells associated with the vector objects may be rendered out-of-order, and in parallel, to leverage the processing capabilities of the GPU. According, the GPU may process the pattern cells, independent of their sequential order, to minimize any latencies caused by waiting for other steps to occur. To further leverage the capabilities of the GPU, the pattern cells may be rendered on a separate rendering surface, such as a pattern surface. All pattern cells are rendered on a single, or limited number, of pattern surface(s) so that the GPU may access them with limited switching among rendering surfaces. As an object is rendered, color values corresponding to the object may be fetched from the pattern surface. Out-of-order processing of pattern cells on a single surface is facilitated by mapping between the vector objects of the artwork and pattern cells of the pattern surface, tracking any offsets. Thus, the digital image rendering techniques utilize out-of-order and parallel rendering of pattern cells on a secondary texture and reuses color values from the secondary texture to paint the actual graphic object in the correct paint order.

By utilizing the GPU hardware in an optimal way, the techniques maximize rendering performance in many ways. For example, the number of framebuffer switches is minimized. Since all pattern cells are rendered on to the same surface and independent of their order in the actual artwork, the current rendering buffer is associated with a first surface in the beginning of first phase and then the current rendering buffer is associated with a second surface at the end of first phase. For example, the current rendering buffer may be associated with a texture surface representing actual images shown at a computer display ("actual surface"), then the current rendering buffer may be associated with a different texture surface ("pattern surface") representing images not shown at the computer display, and thereafter the current rendering buffer may return to, and once again be associated with, the actual surface. The techniques utilize the pattern surface to manipulate images without showing the manipulated images at the computer display. Also, the current rendering buffer does not need to reset any association with a texture surface for every pattern paint object, which is required for many conventional sequential in-order rendering techniques. Further, the number of texture objects is minimized. Since all pattern cells are rendered over a single surface, the number of textures is independent of the number pattern paint objects in the artwork. In addition, the computing device operations are more efficient because the Central Processing unit (CPU) and GPU may operate in parallel. Further, the technique merely caches the region information, i.e., the rendering area over the pattern surface associated with the tile of the texture.

The techniques also maximize rendering performance by batching. For example, the current approach allows batching across vector objects inside pattern cells. General rendering algorithms optimize the rendering time by batching similar graphic objects together based on pre-defined rules. The techniques described herein takes this optimization further and allows batching of the vector artwork content from different pattern cells. This is possible since we are rendering on a pattern surface independent of the actual positions of the pattern content in the artwork. As another example, the current approach allows batching of pattern paint objects. Existing technologies render pattern paints one-at-a-time since each object needs to bind its own cached texture to a fragment shader, also known as a pixel shader, to read the pattern cell raster. In current techniques, since multiple pattern objects have their pattern cell raster in the same texture, the vertices of all pattern objects are merged in a single buffer, binding the common pattern surface texture to the fragment shader program and rendering all patterns in a single rendering call or event provided they follow the predefined rules of batching.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including a rendering application 104. The rendering application 104 represents functionality of the computing device 102 to create images, including vector graphics images. To create images, the rendering application 104 may include a suite of tools, such as tools that enable users to create and arrange a variety of objects including points, lines, basic shapes (e.g., rectangles, squares, ellipses, circles, triangles, and so on), user-defined shapes (e.g., by rendering and connecting a series of lines), and so forth. The rendering application 104 may also include functionality that allows users to change the attributes of these objects, such as the objects' color, transparency, fill type (e.g., solid, gradient, pattern, texture, and so on), depth relative to other objects (e.g., in front of or behind), whether the objects cast shadows, and so forth.

In one or more implementations, the rendering application 104 presents a user interface for display that allows a user to select such tools. The user interface also includes a workspace where the user can create images by leveraging the tools. This portion of the user interface presents objects that are created, arranged, and modified by the user. Further, using the techniques described herein the objects may be presented in the workspace as they are being created. Further, the rendering application 104 is configured to define images using a vector graphics representation in which polygons are used to represent images. In general, vector graphics are based on vectors, which lead through locations called control points or nodes. These points have definite positions on x- and y-axes of a work plane, at least part of which is presented via the workspace of the user interface.

The computing device 102 also includes vector graphics content 106, which is illustrated as maintained in storage 108 of the computing device 102. The vector graphics content 106 can include vector graphics definition data 110 and rendered vector graphics 112. In general, the vector graphics definition data 110 represents data for defining the variety of vector graphics objects (e.g., shapes) included in the vector graphics images maintained by the computing device 102. Consequently, the vector graphics definition data 110 may represent one or more vector graphics images. Vector graphics images contrast with raster images (e.g., bitmaps) which are defined on a per-pixel basis, such that each pixel of an image is associated with color information.

The rendered vector graphics 112 represents vector graphics images or portions of vector graphics images that have been rendered. By way of example, a portion of the vector graphics definition data 110 that defines an image being created via the rendering application 104 may be rendered to form rendered vector graphics 112. The rendered vector graphics 112 may be rendered for display, printing, and so on. Once rendered, the rendered vector graphics 112 may be presented via a display of the computing device 102, e.g., in a workspace portion of the rendering application 104's graphical user interface. Although shown as part of the computing device 102, the vector graphics definition data 110 and the rendered vector graphics 112 may be maintained on other computing devices, such as remote computing devices that are accessible to the computing device 102 over network 114. In one or more scenarios, the computing device 102 may simply obtain a file of the vector graphics definition data 110 and generate the rendered vector graphics 112 from the file, e.g., without a user of the computing device 102 creating a vector graphics image via a rendering application of the computing device 102.

The computing device 102 is also illustrated including rendering module 116 and graphics processing system 118. The illustrated rendering module 116 and graphics processing system 118 are implemented at least partially in hardware of the computing device 102 to process and transform the vector graphics definition data 110. Such processing may include rendering the vector graphics definition data 110 to produce the rendered vector graphics 112, e.g., for display by a display device of the computing device 102 or for printing by a printer associated with the computing device 102. Although illustrated as implemented locally at the computing device 102, functionality of the illustrated rendering module 116 and the graphics processing system 118 may also be implemented in whole or part via functionality available via the network 114, such as part of a web service or "in the cloud."

Examples of functionality incorporated by the illustrated rendering module 116 include controlling rendering of the vector graphics definition data 110 to generate rendered vector graphics 112 according to the described techniques. In particular, the rendering module 116 represents functionality to direct central processing unit (CPU) 120 and/or graphics processing unit (GPU) 122 to perform different portions of a vector graphics rendering workflow. The CPU 120 and the GPU 122 may work in collaboration where the CPU 120 may issue commands to one or more graphics drivers installed in the computing device 102. The graphic driver or drivers may be responsible for execution of the commands at the GPU 122. For example, the CPU 120 may issue rendering calls or events which direct the GPU 122 to execute rendering actions or steps corresponding to the rendering calls or events. Also, the rendering workflow includes the CPU 120 processing the vector graphics definition data 110 of a particular image (e.g., a graphic tree associated with the image) to batch similar objects together based on predefined rules.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Graphic Objects

Figure 2:
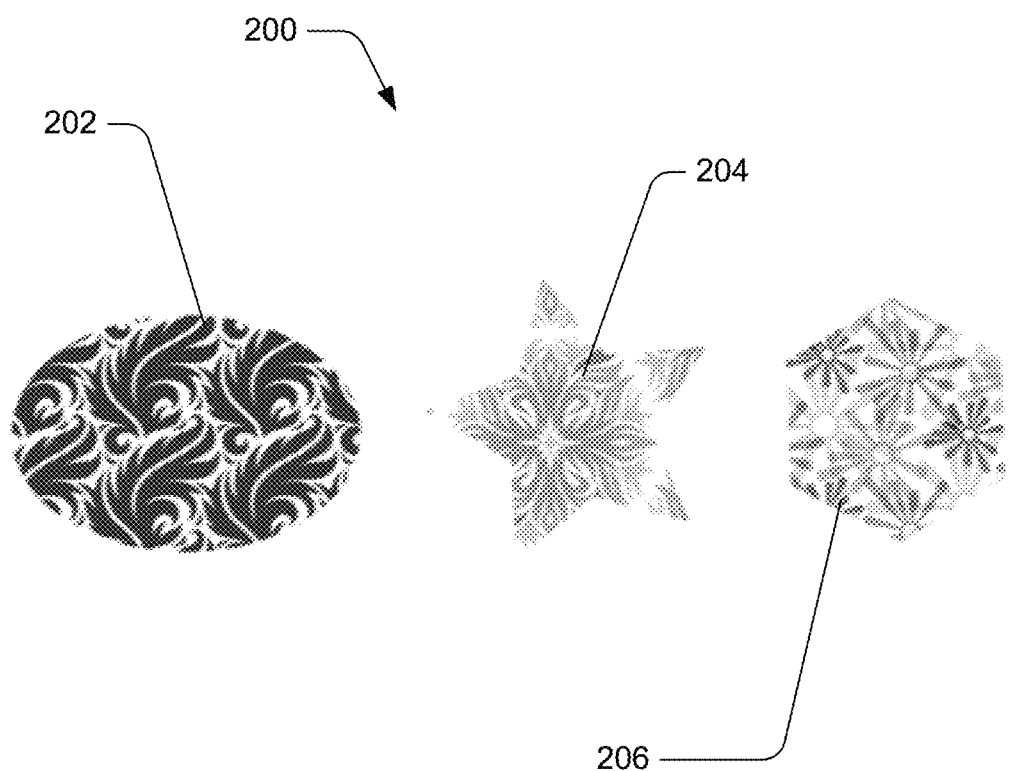
FIG. 2 depicts example implementations of graphic objects colored with pattern paint that may be developed by the digital image rendering techniques.

Referring to FIG. 2, there is shown example graphic objects colored with a pattern paint object on basic shapes. As shown in FIG. 2, an oval shape 202 may include one kind of pattern enclosed within its outline, a star shape 204 may include another kind of pattern, and a hexagon shape 206 may include a third kind of pattern. It should be noted that a portion of each pattern, within each shape 202, 204, and 206, appears similar to one or more other portions of the same pattern. In this manner of tiling an area, the graphic object would appear as if individual patterns repeat in the form of an array and the boundaries of the area are trimmed to correspond to the outline of the graphic object.

Graphics Processing Unit

Figure 3:
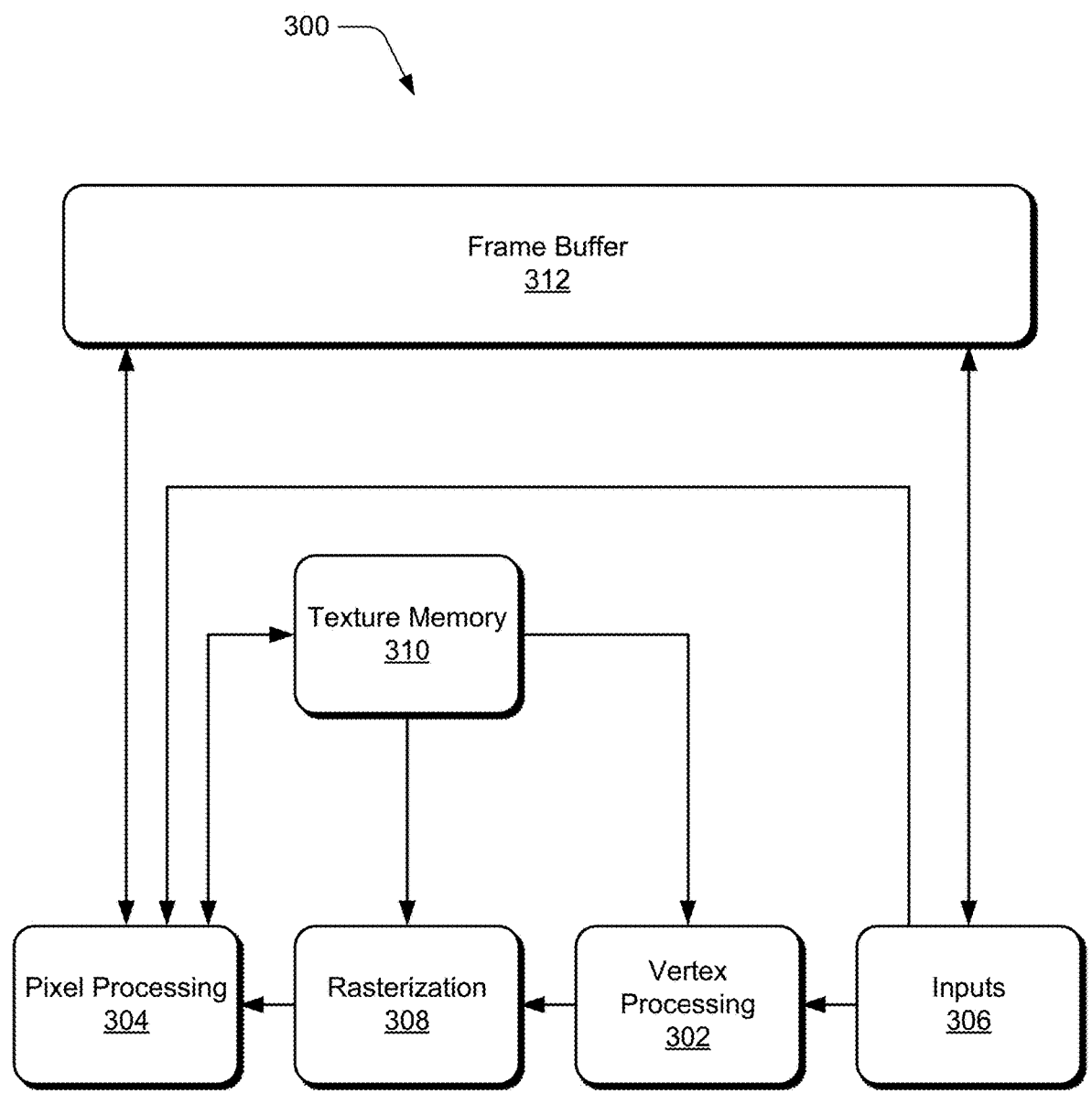
FIG. 3 depicts an example implementation of a graphics processing unit that is operable to employ the digital image rendering techniques.

Referring to FIG. 3, there is shown a general flow 300 of a GPU 122 for processing data. The GPU 122 performs vertex processing 302 and pixel processing 304, and inputs 306 are received from a host system. For vertex processing 302, vertices are defined by coordinates and shapes are defined by connected vertices. Further properties, such as angle and direction may also be defined. The results of vertex processing 302 may be converted into fragments (i.e., pixels) and undergo pixel processing 304 before being displayed. Rasterization 308 is the processing of converting vertices into fragments or pixels, and texture coordinates, stored in texture memory 310, are interpolated from the texture coordinates of the vertices. For pixel processing 304, an application executing on the CPU 120 may offload processing to the GPU 122. The application may also execute commands at the CPU 120 to perform various GPU 122 functions, such as transferring pixel values between system memory and the GPU's framebuffer 312. In particular, the application may write pixel values to the framebuffer 312 and define textures in texture memory 310 so that pixel processing 304 may be performed on those pixel values.

Pattern Cells, Pattern Objects, and Pattern Surface

Graphic objects colored with a pattern paint may be formed from pattern cells and pattern objects. Pattern paint is a widely-used paint type in the world of artwork and illustration. Examples of pattern paint includes the Tiling Pattern (Type 1 Pattern) paint defined in the Adobe PDF specification ("Adobe" is a registered trademark of Adobe Systems Incorporated in the United States and/or other countries) (PDF Reference, Sixth Edition, version 1.7, November 2006). A tiling pattern includes a small graphical figure called a pattern cell, which is repeated at fixed horizontal and vertical intervals to fill a particular area. The pattern cell may include graphical elements such as filled areas, text, and sampled images. The outer shape of the pattern cell may vary, and the spacing of tiles may differ from the dimensions of the cell itself. When performing painting operations, the pattern cell is rendered as many times as necessary to fill the particular area.

Figure 4A:
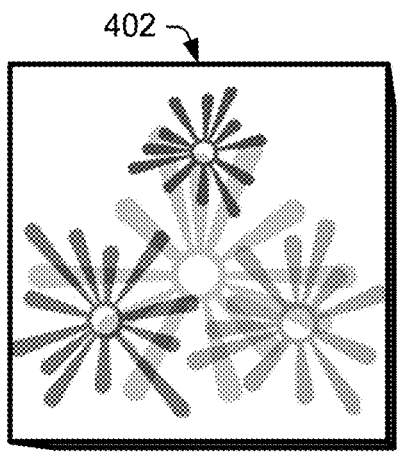
FIGS. 4A through 4D depict example implementations of pattern cells and pattern objects that is employed by the digital image rendering techniques to develop the graphic objects colored with pattern paint.
Figure 4B:
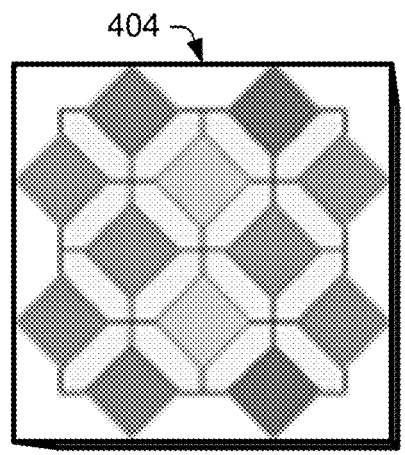
Figure 4C:
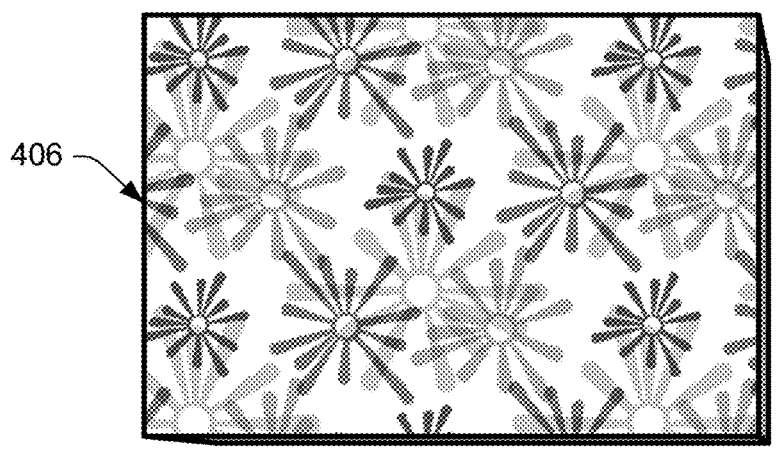
Figure 4D:
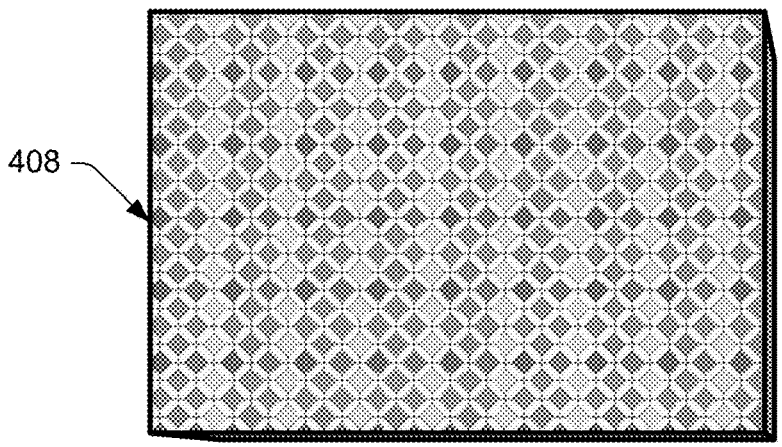

Examples of pattern cells (also known as pattern tiles) are shown in FIGS. 4A and 4B, and examples of pattern objects are shown in FIGS. 4C and 4D. FIG. 4A illustrates an individual pattern 402 of multi-colored spiked images, where three spiked images are positioned about the pattern cell in a triangular format and one large spiked image is positioned in the middle. FIG. 4B illustrates an individual pattern 404 of multi-colored diamonds, where twelve diamonds are interconnected to each other by 2, 3, or 4 lines. FIG. 4C illustrates a pattern object 406 that includes a horizontal and vertical array of spiked images (of FIG. 4A) positioned throughout the object. FIG. 4D illustrates a pattern object 408 that includes a horizontal and vertical array of interconnected diamonds positioned throughout the object.

Figure 5:
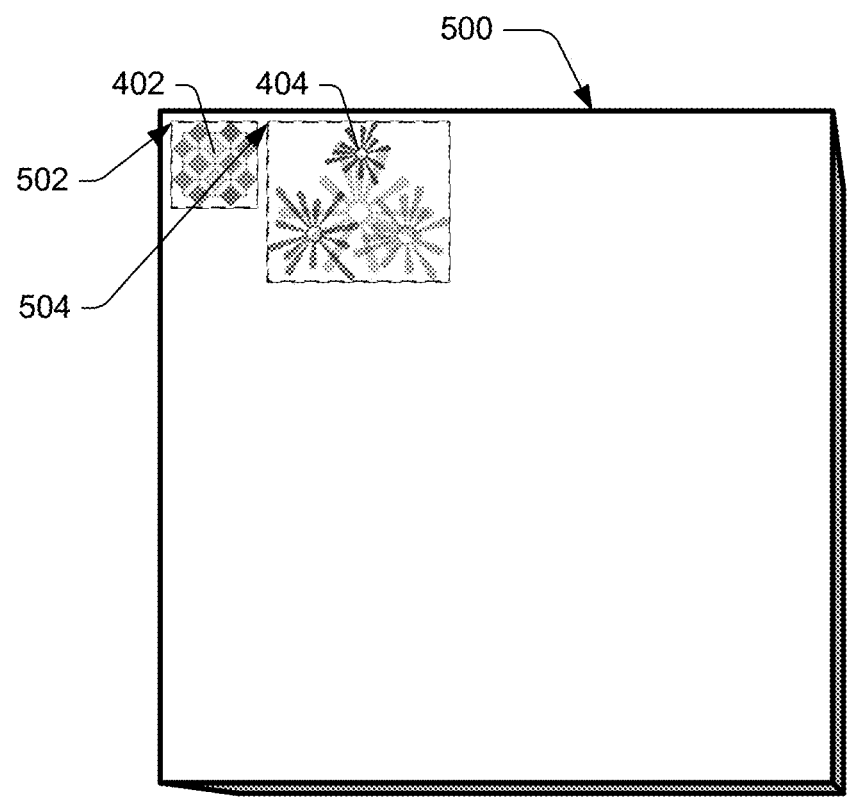
FIG. 5 depicts an example implementation of a pattern surface that is employed by the digital image rendering techniques to develop the graphic objects colored with pattern paint.

Referring to FIG. 5, a first surface 500, such as a pattern surface, is a texture of the digital image rendering techniques to manage the pattern cells 402, 404. For the rendering techniques, a collection of pattern paints is prepared for use in an artwork. For each pattern paint in this collection, its pattern cell is rendered at some location 502, 504 (such as (X-coordinate, Y-coordinate)) at the first surface 500. The pattern cells 402, 404 are not rendered to a second surface, such as an actual surface, which is the texture maintaining the final artwork raster. The pattern cells 402, 404 may be rendered at any available region in the first surface and in any order. Each pattern paint object will retain the location or region information 502, 504 where its corresponding pattern cell 402, 404 is rendered in the first surface 500. Thereafter, when the graphic objects are rendered based on the artwork tree, each object is rendered in its paint order. For each object with a pattern paint, color values are picked from the corresponding location or region 502, 504 at the first surface 500.

Rendering Techniques

Figure 6:
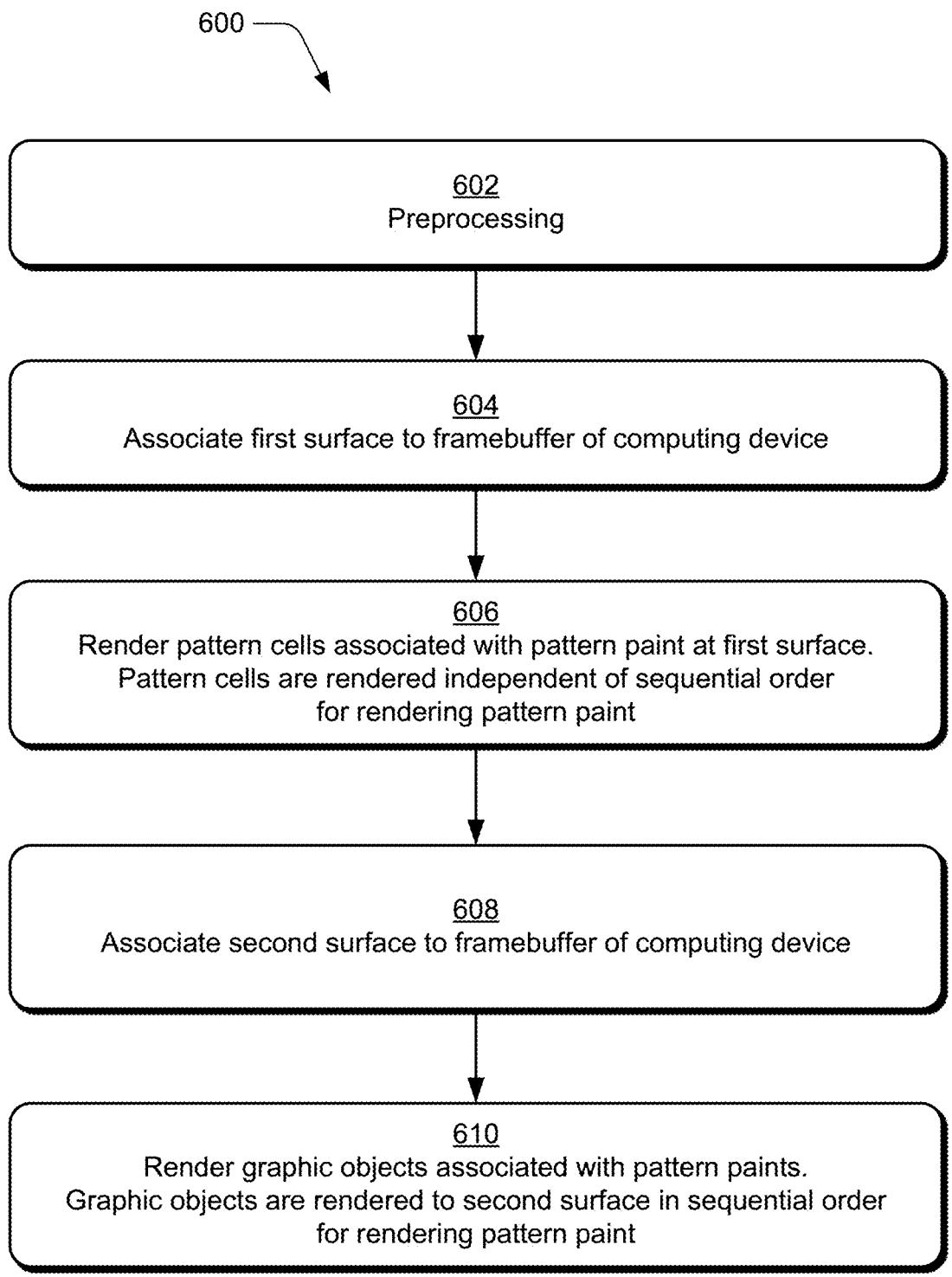
FIG. 6 is a flow diagram depicting a procedure in an example implementation of the digital image rendering techniques.

Referring to FIG. 6, there is shown a digital medium environment to render graphic objects associated with pattern paint. Generally, the steps described below with regard to FIGS. 6 through 9 are performed by the graphics processing system 118, the rendering module 116, and other components of the computing device 102. Although reference is made, below, to the CPU 120 and GPU 122 individually, it is to be understood that the CPU and the GPU work in collaboration to ensure that the necessary steps are executed by one or both components. The CPU 120 performs preprocessing steps for the digital image rendering techniques at step 602, which is explained in more detail below with regard to FIG. 7. After preprocessing, the Graphics Processing Unit (GPU) 122 associates a first surface, such as a pattern surface, to a frame buffer at step 604. For example, the GPU 122 may associate or set the first surface as a color attachment to the framebuffer, also known as the rendering framebuffer. Also, the GPU 122 may save the color attachment of the framebuffer for future use. It should be noted that the first surface and the second surface, such as the textured surface and the actual surface, are textures of the GPU 122, which may be stored at the texture memory 310.

The GPU 122 renders multiple pattern cells at the first surface at step 606, in response to associating the first surface to the framebuffer 312. The multiple pattern cells are associated with corresponding pattern paints. Since multiple pattern cells are rendered at the first surface, the positions of the pattern cells at the first surface are independent of positions of the graphic objects at the second surface. The pattern cells of the first surface are mapped to the graphic objects of the artwork to manage these multiple pattern cells on the single texture or limited number of textures. In this manner, a location at the first surface is stored for each pattern cell when the GPU 122 renders the multiple pattern cells at the first surface. During the rendering of pattern cells at the first surface, the multiple pattern cells are rendered at the first surface independent of their sequential order for rendering pattern paint. Since the pattern cells are rendered independent of their sequential order, multiple pattern cells (i.e., at least two pattern cells) may be rendered at the first surface in parallel to minimize their overall processing time.

The GPU 122 associates or resets a second surface, i.e., the previous texture, to the framebuffer at step 608 in response to completion of rendering pattern cells at the first surface. The GPU 122 previously associated or set the first surface as a color attachment to the framebuffer 312 at step 604. The GPU is now re-associating or restoring the second surface as a color attachment of framebuffer 312 at step 608.

The GPU 122 renders multiple graphic objects associated with the pattern paints at step 610 in response to associating (i.e., setting or resetting) the second surface to the framebuffer. The multiple graphic objects are rendered at the second surface in sequential order for rendering pattern paint. The vertices of the multiple graphic objects are merged in a single buffer and the graphic objects are rendered in a single rendering call or event. As stated above for step 606, the location at the first surface is stored for each pattern cell when the GPU 122 renders the multiple pattern cells at the first surface. Accordingly, at step 610, color information is fetched from the first surface for each graphic object based at least in part on the location of the pattern cell associated with the corresponding pattern paint of the graphic object when the GPU 122 renders the graphic objects associated with the pattern paints.

Figure 7:
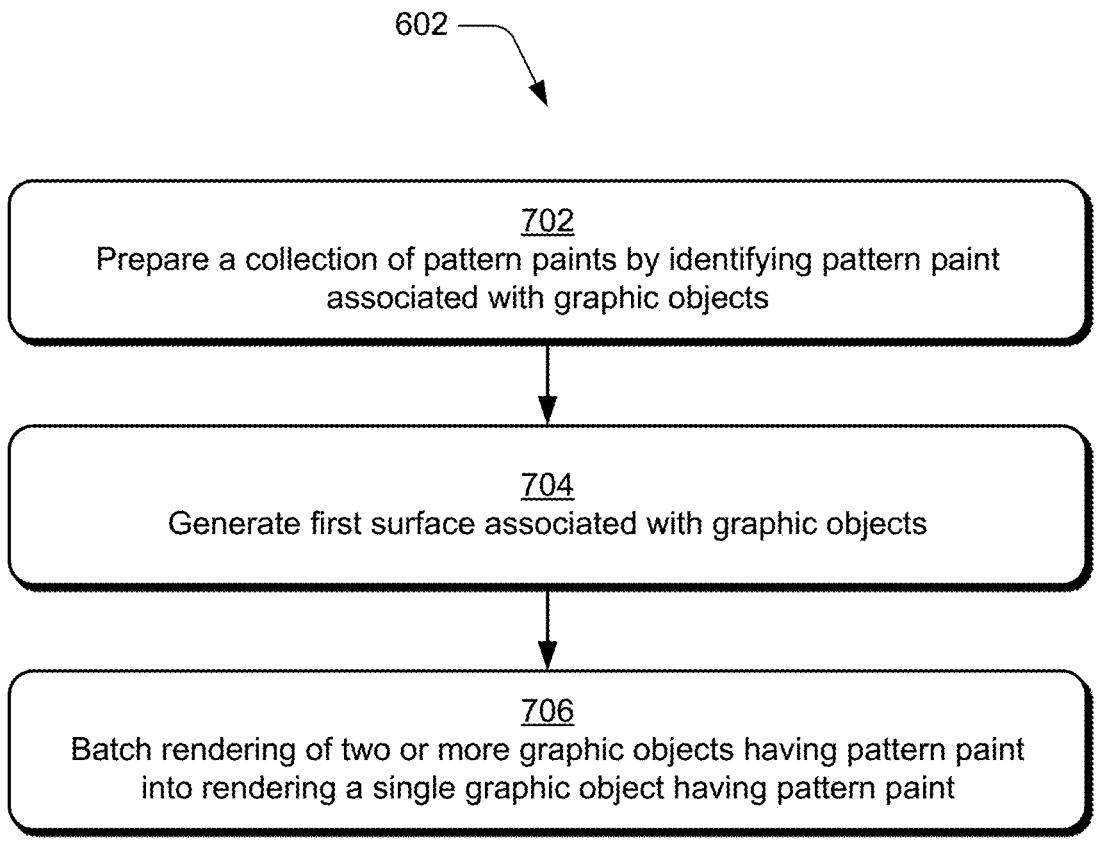
FIG. 7 is a flow diagram depicting a procedure in an example implementation of the preprocessing step of FIG. 6.

FIG. 7 is a flow diagram depicting a procedure in an example implementation of the preprocessing step 602 of FIG. 6, executed by the graphics processing system 118. The multiple pattern paints associated with the graphic objects are identified at the computing device 102, such as the CPU 120, at step 702. The computing device 102 iterates over the artwork and prepares a collection of pattern paints. Also, the first surface associated with the graphics objects is generated at the computing device 102, such as the GPU 122, at step 704. The first surface generated at the computing device is a large texture object. Further, an artwork tree is modified so that the rendering operations of the graphic objects having pattern paint are batched into a single operation of rendering a single graphic object at the computing device 102, such as the CPU 120, at step 706. Multiple graphic objects having pattern paint in the artwork are replaced by a single graphic object so that the graphic objects may be rendered in a single rendering call or event.

Figure 8:
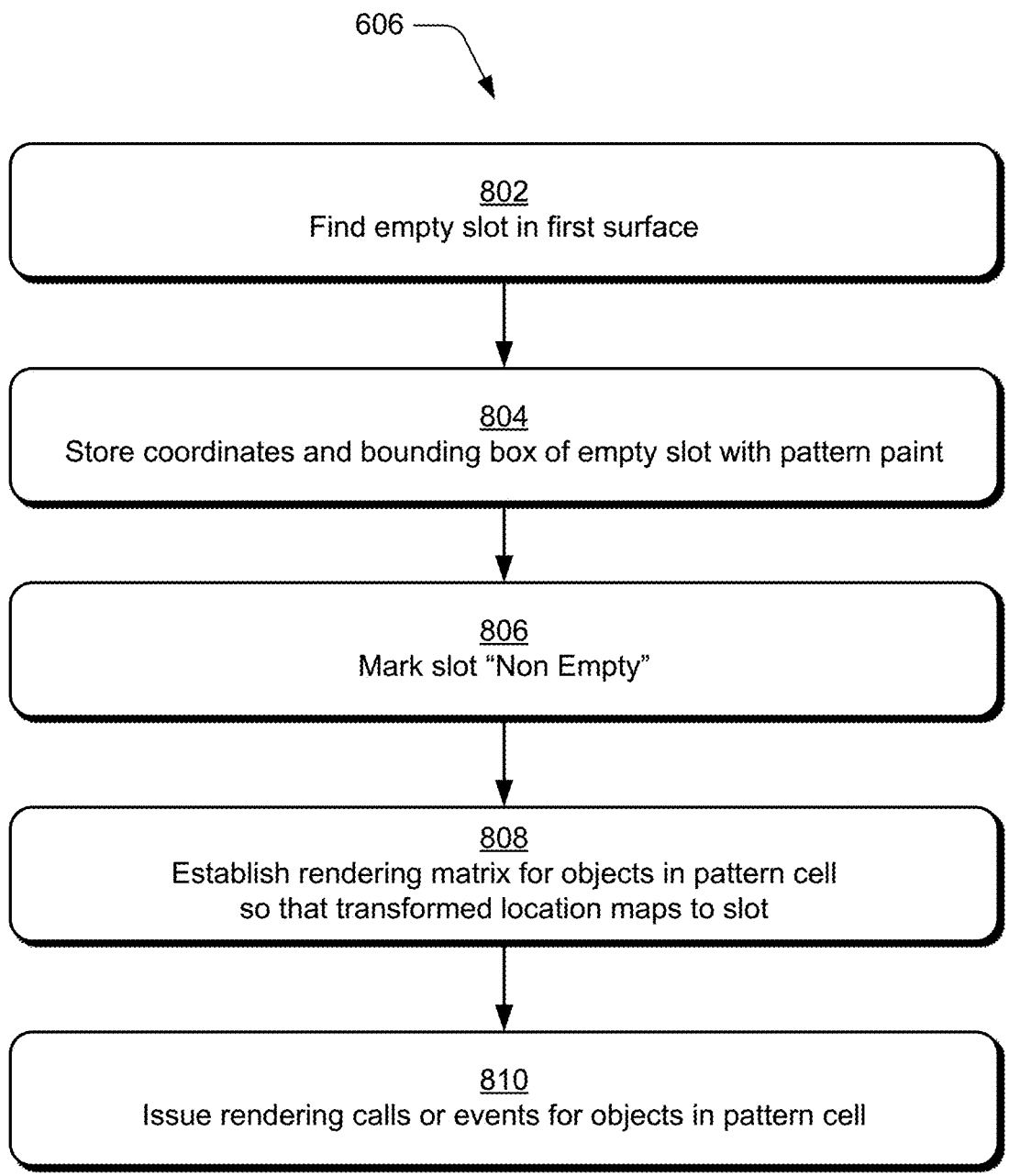
FIG. 8 is a flow diagram depicting a procedure in an example implementation of the pattern cell rendering step of FIG. 6.

FIG. 8 is a flow diagram depicting a procedure in an example implementation of the pattern cell rendering step 606 of FIG. 6, executed by the graphics processing system 118. Generally, for this rendering step 606, multiple pattern cells are rendered at the first surface and a location at the first surface is stored for each pattern cell. Subsequently, during the graphic object rendering step 610, the graphic objects are associated with the pattern paints and color information is fetched from the first surface for each graphic object based at least in part on the location of the pattern cell associated with the corresponding pattern paint of the graphic object.

Referring to FIG. 8, the computing device 102 performs a number of steps to manage multiple pattern cells at a single first surface, or a limited number of first surfaces. The CPU 120 identifies an available slot of the first surface for each pattern cell at step 802. For example, the CPU 120 may find an empty slot in the first surface based on pattern cell bounds. The CPU 120 then stores a location and a bounding box of each available slot associated with a pattern paint at step 804. For example, the CPU 120 may store the coordinates and bounding box of the slot with pattern paint. Next, the CPU 120 marks the available slot as unavailable at step 806. The CPU 120 may mark the slot as "Used", or something equivalent, so that the slot is not used by some other pattern cell in the artwork. After positioning and tracking the location of each pattern cell at the first surface, the CPU 120 establishes or sets a rendering matrix for the multiple graphic objects associated with the pattern cells at step 808. The CPU 120 may establish or set the rendering matrix for the objects in the pattern cell so that the transformed location maps to the slot. Thereafter, the CPU 120 issues rendering calls or events for the multiple pattern cells at the first surface at step 810. For example, the CPU 120 may issue rendering calls or events for execution by the GPU 122 for the pattern cell objects.

Figure 9:
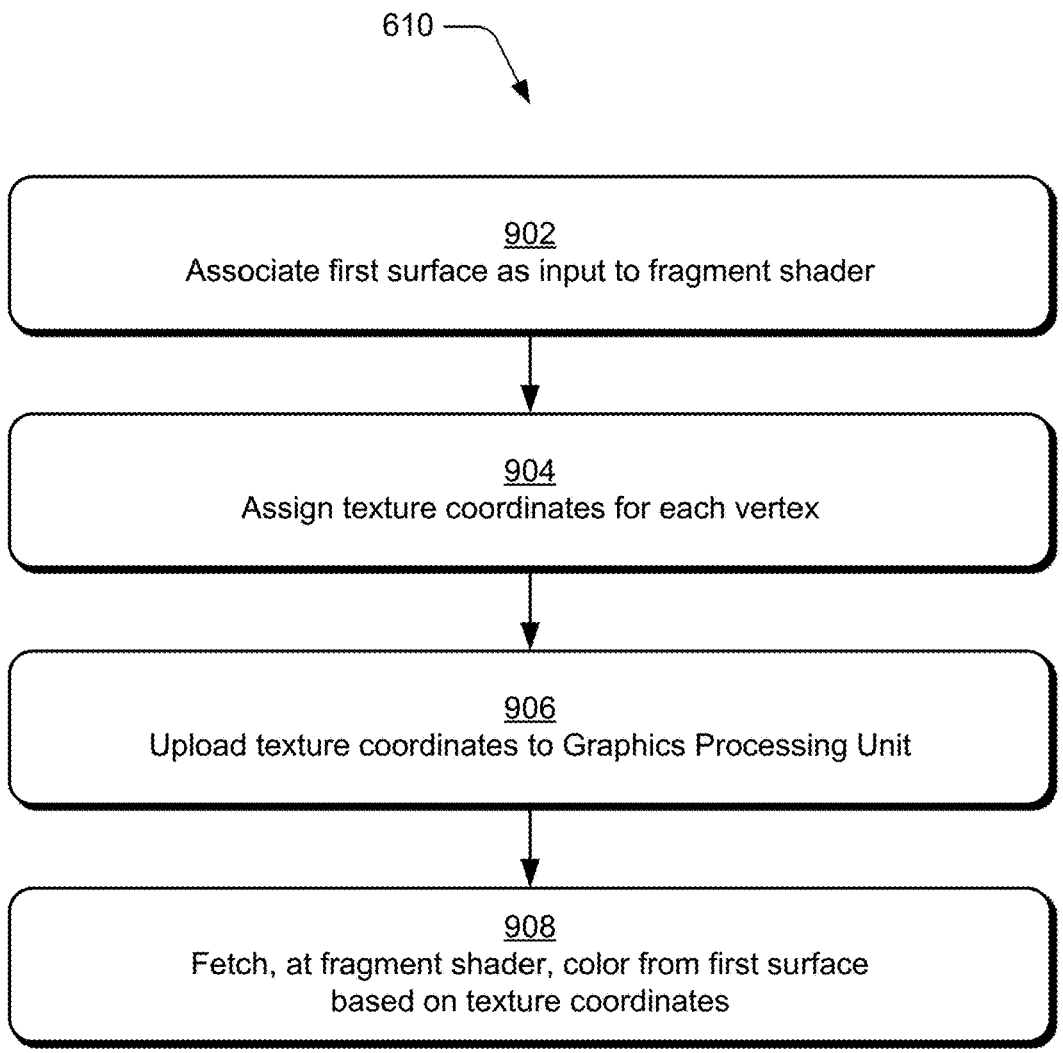
FIG. 9 is a flow diagram depicting a procedure in an example implementation of the graphic object rendering step of FIG. 6.

FIG. 9 is a flow diagram depicting a procedure in an example implementation of the graphic object rendering step 610 of FIG. 6, executed by the graphics processing system 118. The GPU 122 associates or attaches the first surface as an input to a fragment shader, also known as a pixel shader, at step 902. An example of a fragment shader is the pixel processing 304 of FIG. 3. The CPU 120 then assigns a location for each vertex of a tessellated geometry of the graphic object at step 904. Next, the CPU 120 uploads the location for each vertex of the tessellated geometry of the graphic object to the graphics processing unit at step 906. For example, the CPU may compute and assign the texture coordinates for each vertex of the tessellated geometry of the object and, then, upload to the GPU 122 as per-vertex attributes. Thereafter, the GPU 122 fetches color information from the first surface for each graphic object based on the location for each vertex at step 908. For example, the fragment shader of the GPU 122 may fetch the color to complete the graphic object rendering step 610.

Regarding the assignment of texture coordinates for each vertex at step 904, the computation of the texture coordinates may be explained by the example below. The width and height of the first surface texture may be referenced by $(A_w, A_h)$, and the offset at which pattern artwork is rendered in the texture atlas may be referenced by $(o_x, o_y)$. This offset may be stored in a cache during the graphic object rendering step 610. The texture coordinates (u, v) may be mapped to final texture coordinates $(u_a, v_a)$ using the following equations:

$$(u', v') = (o_x + u*I_w, o_y + v*I_h) \tag{1}$$

$$(u_a, v_a) = \left(\frac{u'}{A_w}, \frac{v'}{A_h}\right) \tag{2}$$

Example System and Device

Figure 10:
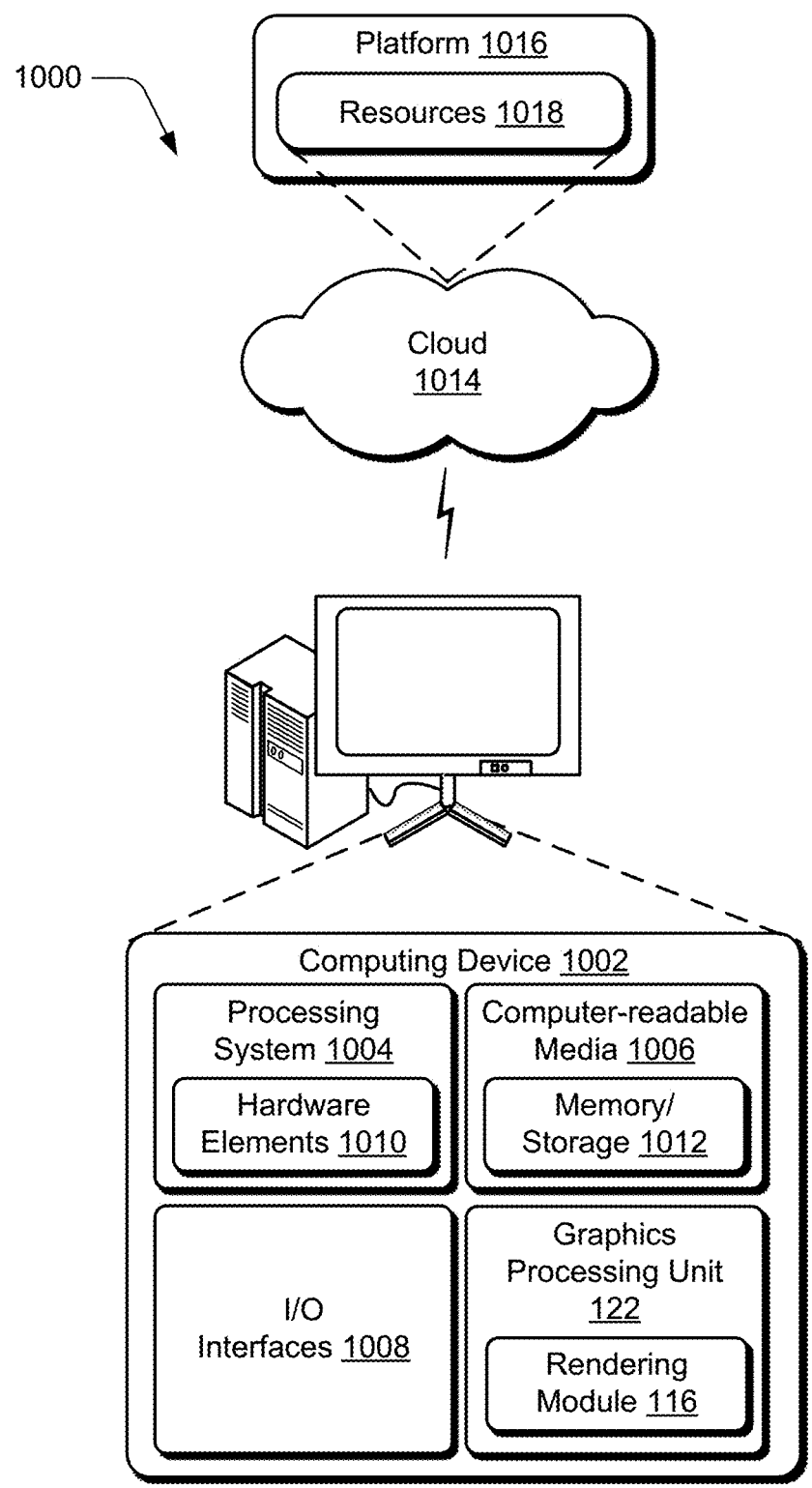
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the rendering module 116. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random-access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to render graphic objects associated with pattern paint, a method implemented by a computing device utilizing a graphics processing unit, the method comprising:
   associating, at the graphics processing unit, a pattern surface to a framebuffer, the associating including directing the frame buffer from a texture surface representing displayed images to the pattern surface representing non-displayed images, the pattern surface being a separate rendering surface than the texture surface;
   rendering, at the graphics processing unit, a plurality of different appearing pattern cells at the pattern surface as the non-displayed images, the plurality of different appearing pattern cells used to form pattern paints and all of the different appearing pattern cells rendered at the pattern surface independent of their sequential order for rendering the pattern paints;
   re-associating, at the graphics processing unit, the framebuffer from the pattern surface back to the texture surface, the re-associating including the texture surface being reset to the framebuffer upon completion of the rendering the plurality of different appearing pattern cells at the pattern surface;
   rendering, at the graphics processing unit, graphic objects associated with the pattern paints, the graphic objects being the displayed images and rendered at the texture surface in sequential order for rendering the pattern paints from the plurality of different appearing pattern cells; and
   batching the rendering of the graphic objects having pattern paint from different pattern cells of the plurality of different appearing pattern cells by replacing the graphic objects with a single graphic object having the pattern paint, the single graphic object being rendered in a single rendering event.

2. The method as described in claim 1, wherein the rendering the plurality of different appearing pattern cells at the pattern surface includes rendering at least two of the different appearing pattern cells of the plurality of different appearing pattern cells at the pattern surface in parallel.

3. The method as described in claim 1, further comprising:
   identifying the pattern paints associated with the graphic objects; and
   generating the pattern surface associated with the graphics objects.

4. The method as described in claim 1, wherein:
   rendering the plurality of different appearing pattern cells at the pattern surface includes storing a location of each pattern cell of the plurality of different appearing pattern cells; and
   rendering the graphic objects associated with the pattern paints includes fetching color information from the pattern surface for each graphic object based at least in part on the location of the respective pattern cell associated with the corresponding pattern paint of the graphic object.

5. The method as described in claim 1, wherein rendering the plurality of different appearing pattern cells at the pattern surface, comprises:
   identifying an available slot of the pattern surface for each pattern cell of the plurality of different appearing pattern cells;
   storing a location and a bounding box of each available slot associated with a pattern paint;
   marking the available slot as unavailable;
   establishing a rendering matrix for the graphic objects associated with the plurality of different appearing pattern cells; and
   issuing rendering events for the plurality of different appearing pattern cells at the pattern surface.

6. The method as described in claim 1, wherein positions of the plurality of different appearing pattern cells at the pattern surface are independent of positions of the graphic objects at the texture surface.

7. The method as described in claim 1, wherein rendering the graphic objects associated with the pattern paints, comprises:
   associating the pattern surface as an input to a fragment shader;
   assigning a location for each vertex of a tessellated geometry of the graphic object;
   uploading the location for each vertex of the tessellated geometry of the graphic object to the graphics processing unit; and
   fetching, at the fragment shader, color information from the pattern surface for each graphic object based on the location for each vertex.

8. The method as described in claim 1, wherein rendering the graphic objects associated with the pattern paints, comprises:

merging vertices of the graphic objects in a single buffer; and rendering the graphic objects in a single rendering event.

9. A computing device for rendering graphic objects associated with pattern paint in a digital medium environment, the computing device comprising:
- a framebuffer of the computing device; and
- a graphics processing unit to:
  - associate a pattern surface to the framebuffer, which directs the framebuffer from a texture surface representing displayed images to the pattern surface representing non-displayed images, the pattern surface being a separate rendering surface than the texture surface;
  - render a plurality of different appearing pattern cells at the pattern surface as the non-displayed images, the plurality of different appearing pattern cells corresponding to pattern paints and all of the different appearing pattern cells rendered at the pattern surface independent of a sequential order of the plurality of different appearing pattern cells for rendering the pattern paints;
  - re-associate the framebuffer from the pattern surface back to the texture surface, which resets the texture surface to the framebuffer upon completion of the plurality of different appearing pattern cells rendered at the pattern surface;
  - render graphic objects associated with the pattern paints, the graphic objects being the displayed images and rendered at the texture surface in sequential order for rendering the pattern paints from the plurality of different appearing pattern cells; and
  - batch render the graphic objects having pattern paint from different pattern cells of the plurality of different appearing pattern cells by replacing the graphic objects with a single graphic object having the pattern paint, the single graphic object being rendered in a single rendering event.

10. The computing device as described in claim 9, wherein the graphics processing unit renders at least two of the different appearing pattern cells of the plurality of different appearing pattern cells at the pattern surface in parallel.

11. The computing device as described in claim 9, further comprising a central processing unit configured to identify the pattern paints associated with the graphic objects.

12. The computing device as described in claim 9, further comprising a central processing unit configured to:
- store in memory a location of each pattern cell of the plurality of different appearing pattern cells; and
- fetch color information from the pattern surface for each graphic object based at least in part on the location of the respective pattern cell associated with the corresponding pattern paint of the graphic object.

13. The computing device as described in claim 9, further comprising a central processing unit configured to:
- identify an available slot of the pattern surface for each pattern cell of the plurality of different appearing pattern cells;
- store in memory a location and a bounding box of each available slot associated with a pattern paint;
- mark the available slot as unavailable;
- establish a rendering matrix for the graphic objects associated with the plurality of different appearing pattern cells; and
- issue rendering events for the plurality of different appearing pattern cells at the pattern surface.

14. The computing device as described in claim 9, wherein positions of the plurality of different appearing pattern cells at the pattern surface are independent of positions of the graphic objects at the texture surface.

15. The computing device as described in claim 9, further comprising a central processing unit and a fragment shader, wherein:
- the central processing unit is configured to associate the pattern surface as an input to the fragment shader;
- the central processing unit is configured to assign a location for each vertex of a tessellated geometry of the graphic object and upload the location for each vertex of the tessellated geometry of the graphic object to the graphics processing unit; and
- the fragment shader is configured to fetch color information from the pattern surface for each graphic object.

16. The computing device as described in claim 9, wherein the graphics processing unit is configured to merge vertices of the graphic objects in a single buffer and render the graphic objects in a single rendering event.

17. In a digital medium environment to render graphic objects associated with pattern paints, a method implemented by a computing device utilizing a graphics processing unit, the method comprising:
- associating, at the graphics processing unit, a pattern surface to a framebuffer by directing the framebuffer from a texture surface representing displayed images to the pattern surface representing non-displayed images, the pattern surface being a separate rendering surface than the texture surface;
- rendering, at the graphics processing unit, a plurality of different appearing pattern cells at the pattern surface as the non-displayed images, a location at the pattern surface being stored for each pattern cell of the plurality of different appearing pattern cells;
- re-associating, at the graphics processing unit, the framebuffer from the pattern surface back to the texture surface, the re-associating including the texture surface being reset to the framebuffer upon completion of the rendering the plurality of different appearing pattern cells at the pattern surface;
- rendering, at the graphics processing unit, graphic objects associated with the pattern paints, the rendering the graphic objects as the displayed images including fetching color information from the pattern surface for each graphic object based at least in part on the location of the pattern cell associated with the corresponding pattern paint of the graphic object; and
- batching the rendering of the graphic objects having pattern paint from different pattern cells of the plurality of different appearing pattern cells by replacing the graphic objects with a single graphic object having the pattern paint, the single graphic object being rendered in a single rendering event.

18. The method as described in claim 17, further comprising:
- identifying the pattern paints associated with the graphic objects; and
- generating the pattern surface associated with the graphics objects.

19. The method as described in claim 17, wherein positions of the plurality of different appearing pattern cells at the pattern surface are independent of positions of the graphic objects at the texture surface.

20. The method as described in claim 17, wherein rendering the graphic objects associated with the pattern paints, comprises:

merging vertices of the graphic objects in a single buffer; and rendering the graphic objects in a single rendering event.

\* \* \* \* \*